(12) United States Patent
Lv et al.

(10) Patent No.: US 10,691,888 B2
(45) Date of Patent: Jun. 23, 2020

(54) METHOD, TERMINAL, APPARATUS AND COMPUTER-READABLE STORAGE MEDIUM FOR EXTRACTING A HEADWORD

(71) Applicant: Ping An Technology (Shenzhen) Co., Ltd., Shenzhen, Guangdong (CN)

(72) Inventors: Zishen Lv, Guangdong (CN); Yong Wei, Gugangdong (CN); Qingyuan Zhao, Guangdong (CN); Liang Xu, Guangdong (CN); Jing Xiao, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 124 days.

(21) Appl. No.: 16/097,292

(22) PCT Filed: Aug. 30, 2017

(86) PCT No.: PCT/CN2017/099548
§ 371 (c)(1),
(2) Date: Oct. 29, 2018

(87) PCT Pub. No.: WO2018/227767
PCT Pub. Date: Dec. 20, 2018

(65) Prior Publication Data
US 2019/0340237 A1  Nov. 7, 2019

(30) Foreign Application Priority Data

Jun. 16, 2017 (CN) .......................... 2017 1 0458910

(51) Int. Cl.
*G06F 17/27* (2006.01)
*G06F 40/258* (2020.01)
(Continued)

(52) U.S. Cl.
CPC .......... *G06F 40/258* (2020.01); *G06F 40/242* (2020.01); *G06K 9/00456* (2013.01); *G06K 9/00463* (2013.01)

(58) Field of Classification Search
USPC ......... 704/9; 707/723, 740, 728, 769; 713/2; 706/52
See application file for complete search history.

(56) References Cited

U.S. PATENT DOCUMENTS

| 6,799,176 B1 * | 9/2004 | Page .................... G06F 16/951 |
| 2005/0149502 A1 * | 7/2005 | McSherry ........... G06F 16/9535 |

(Continued)

*Primary Examiner* — Michael Colucci

(57) ABSTRACT

Disclosed are a method, a terminal, and an apparatus for extracting a headword and a computer-readable storage medium, wherein the method comprises: acquiring a text information input by a user; determining an out-edge weight of each search term of the text information; calculating a linkage-matrix for the each search term; calculating a priori score of the each search term according to a preset document library; determining a random jumping vector for the each search term according to the priori score; calculating a first preliminary score of the each search term according to the linkage-matrix and the random jumping vector; determining a second preliminary score of the each search term according to a preset part-of-speech configuration rule; determining a final degree score of the each search term according to the first preliminary score and the second preliminary score; extracting the headword of the text information according to the final degree score.

15 Claims, 6 Drawing Sheets

(51) Int. Cl.
  *G06K 9/00* (2006.01)
  *G06F 40/242* (2020.01)

(56) References Cited

U.S. PATENT DOCUMENTS

| | | | |
|---|---|---|---|
| 2005/0256860 A1* | 11/2005 | Eiron | G06F 16/951 |
| 2008/0177994 A1* | 7/2008 | Mayer | G06F 9/4418 |
| | | | 713/2 |
| 2008/0270390 A1* | 10/2008 | Ward | G06F 16/951 |
| 2010/0106719 A1* | 4/2010 | Donato | G06F 16/355 |
| | | | 707/728 |
| 2010/0306158 A1* | 12/2010 | Andersen | G06F 17/10 |
| | | | 706/52 |
| 2010/0306249 A1* | 12/2010 | Hill | G06Q 50/01 |
| | | | 707/769 |
| 2015/0220530 A1* | 8/2015 | Banadaki | G06F 16/90 |
| | | | 707/723 |

* cited by examiner

US 10,691,888 B2

METHOD, TERMINAL, APPARATUS AND COMPUTER-READABLE STORAGE MEDIUM FOR EXTRACTING A HEADWORD

The present application claims the priority to the Chinese patent application No. CN201710458910.8, filed with the Chinese Patent Office on Jun. 16, 2017 and entitled "method, terminal and apparatus for extracting a headword", the contents of which are incorporated herein by reference in its entirety.

FIELD OF INVENTION

The present disclosure relates to the technology field of computer technology, and more particularly, to a method, a terminal, an apparatus and a computer-readable storage medium for extracting a headword.

BACKGROUND OF INVENTION

The extraction of headword, is to extract some important words from a natural language text that can summarize the content of the text. At present, the common methods for extracting headwords comprises TF-IDF method, TextRank method, etc. These methods have certain versatility, but the above common methods have the following disadvantages: the method by using the characteristics of the text itself input by user to extract headword is very limited, and for applications in specific fields, using the existing methods to extract headword directly will lead to an unsatisfactory extraction result and fail to meet the requirements for the applications.

SUMMARY OF THE INVENTION

The embodiments of the present disclosure provide a method, a terminal, an apparatus and a computer-readable storage medium for extracting a headword, which could fully utilize the characteristic information of the text itself to extract the headword, improve the effect of headword extraction, and further meet the requirements for the applications.

In one aspect, the embodiments of the present disclosure provide a method for extracting a headword, comprising: acquiring a text information input by a user, and the text information comprises one or more search terms; determining an out-edge weight of each search term; calculating a linkage-matrix for the each search term of the text information according to the out-edge weight; calculating a priori score of the each search term according to a preset document library; determining a random jumping vector for the search term of the text information according to the priori score; calculating a first preliminary score of the each search term according to the linkage-matrix and the random jumping vector; determining a second preliminary score of the each search term according to a preset part-of-speech configuration rule; determining a final degree score of the each search term according to the first preliminary score and the second preliminary score; and extracting the headword of the text information according to the final degree score.

Further, the step of determining an out-edge weight of each search term comprises: determining an out-edge distance of the each search term; and determining the out-edge weight according to the out-edge distance.

Further, the step of calculating a priori score of the each search term according to a preset document library comprises: counting a number of times that the each search term appears in the preset document library; counting a number of documents in which the each search term appears in the preset document library; counting a number of characters appearing in the preset document library for the each search term; and calculating the priori score according to the number of times, the number of documents and the number of characters that the each search term appears in the preset document library.

Further, the random jumping vector for the each search term of the text information is calculated according to the following formula: $r_t = \lambda A r_{t-1} + (1-\lambda)g$; wherein, subscript t represents the t-th iteration; $r_t$ is the result of the t-th iteration, and $r_{t-1}$ is the result of the t−1-th iteration; A is the linkage-matrix; $\lambda$ is a weighting coefficient, for adjusting the relative weight of "jumping according to the link" and "random jumping"; g is the random jumping vector.

Further, the step of determining a final degree score of the each search term according to the first preliminary score and the second preliminary score comprises: performing a weighted calculation on the first preliminary score and the second preliminary score according to a preset weighted rule; and using a result of the weighted calculation as the final degree score of each search term.

In another aspect, the embodiments of the present disclosure also provide a terminal for extracting a headword, comprising: a first acquiring unit, for acquiring a text information input by a user, and the text information comprises one or more search terms; an out-edge weight determining unit, for determining an out-edge weight of each search term; a linkage-matrix calculating unit, for calculating a linkage-matrix for the each search term of the text information according to the out-edge weight; a priori score calculating unit, for calculating a priori score of the each search term according to a preset document library; a random jumping vector determining unit, for determining a random jumping vector for the each search term of the text information according to the priori score; a first preliminary score calculating unit, for calculating a first preliminary score of the each search term according to the linkage-matrix and the random jumping vector; a second preliminary score determining unit, for determining a second preliminary score of the each search term according to a preset part-of-speech configuration rule; a final degree score determining unit, for determining a final degree score of the each search term according to the first preliminary score and the second preliminary score; and a headword extracting unit, for extracting the headword of the text information according to the final degree score.

Further, the out-edge weight determining unit comprises: an out-edge distance determining unit, for determining an out-edge distance of the each search term; and an out-edge weight determining subunit, for determining the out-edge weight according to the out-edge distance.

Further, the priori score calculating unit comprises: a number of times counting unit, for counting a number of times that the each search term appears in the preset document library; a number of document counting unit, for counting a number of documents in which the each search term appears in the preset document library; a number of characters counting unit, for counting a number of characters appearing in the preset document library for the each search term; and a priori score calculating subunit, for calculating the priori score according to the number of times, the number of documents and the number of characters that each search term appears in the preset document library.

Further, the random jumping vector determining unit is specifically for calculating the random jumping vector for the each search term of the text information according to the formula as follow: $r_t = \lambda A r_{t-1} + (1-\lambda)g$; wherein, subscript t represents the t-th iteration; $r_t$ is the result of the t-th iteration, and $r_{t-1}$ is the result of the t−1-th iteration; A is the linkage-matrix; $\lambda$ is a weighting coefficient, for adjusting the relative weight of "jumping according to the link" and "random jumping"; g is the random jumping vector.

Further, the final degree score determining unit comprises: a weighted calculation unit, for performing a weighted calculation on the first preliminary score and the second preliminary score according to a preset weighted rule; and a final degree score determining subunit, for using a result of the weighted calculation as the final degree score of each search term.

In another aspect, the embodiments of the present disclosure also provide an apparatus for extracting a headword, comprising: a memory and a processor; the memory is provided for storing a program for implementation; the processor is provided for running the program stored in the memory to perform the following operations: acquiring a text information input by a user, and the text information comprises one or more search terms; determining an out-edge weight of each search term; calculating a linkage-matrix for the each search term of the text information according to the out-edge weight; calculating a priori score of the each search term according to a preset document library; determining a random jumping vector for the each search term of the text information according to the priori score; calculating a first preliminary score of the each search term according to the linkage-matrix and the random jumping vector; determining a second preliminary score of the each search term according to a preset part-of-speech configuration rule; determining a final degree score of each search term according to the first preliminary score and the second preliminary score; and extracting the headword of the text information according to the final degree score.

Further, the operation of determining an out-edge weight of each search term comprises: determining an out-edge distance of the each search term; and determining the out-edge weight according to the out-edge distance.

Further, the operation of calculating a priori score of the each search term according to a preset document library comprises: counting a number of times that each search term appears in the preset document library; counting a number of documents in which the each search term appears in the preset document library; counting a number of characters appearing in the preset document library for the each search term; and calculating the priori score according to the number of times, the number of documents and the number of characters that the each search term appears in the preset document library.

Further, the random jumping vector for the each search term of the text information is calculated according to the following formula: $r_t = \lambda A r_{t-1} + (1-\lambda)g$; wherein, subscript t represents the t-th iteration; $r_t$ is the result of the t-th iteration, and $r_{t-1}$ is the result of the t−1-th iteration; A is the linkage-matrix; $\lambda$ is a weighting coefficient, for adjusting the relative weight of "jumping according to the link" and "random jumping"; g is the random jumping vector.

Further, the operation of determining a final degree score of the each search term according to the first preliminary score and the second preliminary score comprises: performing a weighted calculation on the first preliminary score and the second preliminary score according to a preset weighted rule; and using a result of the weighted calculation as the final degree score of each search term.

In another aspect, the embodiments of the present disclosure also provides a computer-readable storage medium, wherein the computer-readable storage medium stores one or more programs, and the one or more programs could be run by one or more processors to implement the following steps: acquiring a text information input by a user, and the text information comprises one or more search terms; determining an out-edge weight of each search term; calculating a linkage-matrix for the each search term of the text information according to the out-edge weight; calculating a priori score of each search term according to a preset document library; determining a random jumping vector for the each search term of the text information according to the priori score; calculating a first preliminary score of the each search term according to the linkage-matrix and the random jumping vector; determining a second preliminary score of the each search term according to a preset part-of-speech configuration rule; determining a final degree score of the each search term according to the first preliminary score and the second preliminary score; and extracting the headword of the text information according to the final degree score.

Further, the step of determining an out-edge weight of each search term comprises: determining an out-edge distance of the each search term; and determining the out-edge weight according to the out-edge distance.

Further, the step of calculating a priori score of the each search term according to a preset document library comprises: counting a number of times that the each search term appears in the preset document library; counting a number of documents in which the each search term appears in the preset document library; counting a number of characters appearing in the preset document library for the each search term; and calculating the priori score according to the number of times, the number of documents and the number of characters that the each search term appears in the preset document library.

Further, the random jumping vector for the each search term of the text information is calculated according to the following formula: $r_t = \lambda A r_{t-1} + (1-\lambda)g$;

wherein, subscript t represents the t-th iteration; $r_t$ is the result of the t-th iteration, and $r_{t-1}$ is the result of the t−1-th iteration (each iteration is calculated based on the result of the previous iteration); A is the linkage-matrix; $\lambda$ is a weighting coefficient, for adjusting the relative weight of "jumping according to the link" and "random jumping"; g is the random jumping vector.

Further, the step of determining a final degree score of the each search term according to the first preliminary score and the second preliminary score comprises: performing a weighted calculation on the first preliminary score and the second preliminary score according to a preset weighted rule; and using a result of the weighted calculation as the final degree score of the each search term.

In conclusion, the embodiments of the present disclosure may have the following beneficial effects: the embodiments of the present disclosure acquire the text information input by user (the text information comprises one or more search terms), and determine an out-edge weight of each search term, and calculate a linkage-matrix for all the search terms of the text information according to the out-edge weights, and calculate a priori score of each search term according to a preset document library, and determine a random jumping vector for all the search terms of the text information according to the priori score, and calculate a first preliminary score of each search term according to the linkage-matrix and the random jumping vector, and determine a second preliminary score of each search term according to a preset part-of-speech configuration rule, and determine a final degree score of each search term according to the first preliminary score and the second preliminary score, and extract the headword of the text information according to the final degree scores, which could fully utilize the characteristic information of the text itself to extract the headword, and improve the effect of headword extraction, and also meet the extraction requirements of headword for the applications.

BRIEF DESCRIPTION OF THE DRAWINGS

In order to more clearly describe the technical solutions of the embodiments of the present disclosure, the accompanying drawings used in the embodiments are briefly described below. Obviously, the drawings in the following description are some embodiments of the present disclosure, and for person skilled in the art, other drawings may also be obtained according to these drawings without any creative work.

DESCRIPTION OF THE EMBODIMENTS

The technical solutions of the embodiments of the present disclosure will be clearly and completely described below with reference to the accompanying drawings of the embodiments of the present disclosure. Obviously, the described embodiments are some but not all of the embodiments of the present disclosure. All other embodiments obtained by person skilled in the art based on the embodiments of the present disclosure without creative efforts shall fall into the protection scope of the present disclosure.

It will be understood that when used in this specification and the appended claims, the terms "comprising" and "including" indicate the existence of stated features, entirety, steps, operations, elements and/or components, but do not exclude the existence or addition of one or more other features, entirety, steps, operations, elements, components and/or sets thereof.

It will also be understood that the terminology used in the description of the present disclosure herein is only for the purpose of describing particular embodiments and is not intended to limit the present disclosure. As used in the description and the appended claims of the present disclosure, the singular forms "a," "an," and "the" also comprise the plural forms as well, unless the context clearly indicates otherwise.

Figure 1:
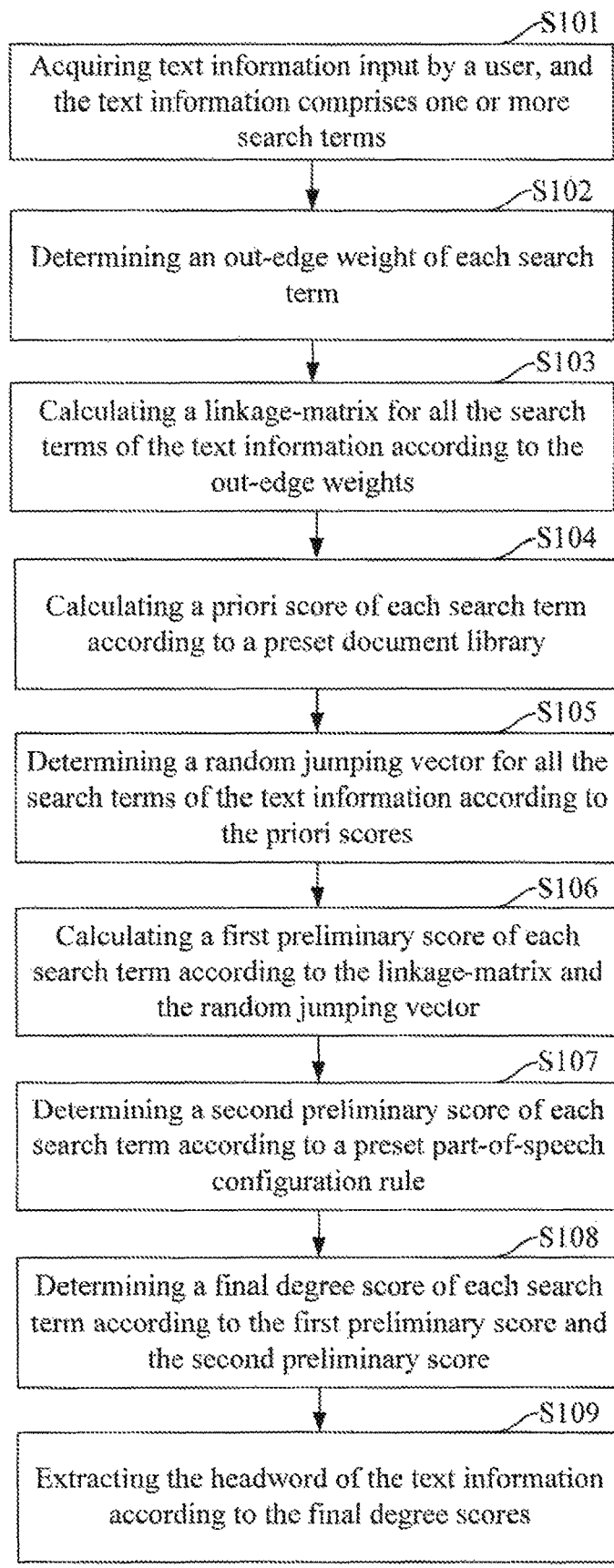
FIG. 1 is a schematic flowchart of a method for extracting a headword according to an embodiment of the present disclosure.

Please refer to FIG. 1, and FIG. 1 is a schematic flowchart of a method for extracting a headword according to an embodiment of the present disclosure. The method could be operated in smartphones (such as Android phones, IOS phones, etc.), tablet computers, notebook computers, and smart devices. The method mainly extracts the headword of the text information input by user, and the method of the present disclosure could fully utilize the characteristic information of the text itself to extract the headword and improve the effect of the headword extraction, and could also meet the extraction requirements of headword for the applications. As shown in FIG. 1, the steps of the method comprise S101~S109.

S101, acquiring text information input by a user, and the text information comprises one or more search terms.

In the embodiment of the present disclosure, for example, a user inputs text information to be searched into a web browser or a search engine on a terminal, such as "excavation of ancient tomb of Lu'an", and the web browser or the search engine of the terminal acquires the text information input by the user in real time, that's the "excavation of ancient tomb of Lu'an", and the text information comprises a plurality of search terms, which are "Lu'an", "ancient tomb" and "excavation", so that search terms of the text information are determined according to the text information input by the user.

S102, determining an out-edge weight of each search term.

In the prior art, for the text information input by the user in a same specified input window, the voting weight of one search term to other search terms is the same, and in different specified input windows, the same edges are not added repeatedly; however, in actual applications, the search term in the same position have different contributions to the search terms of different distances; for a search term, the influence on other search terms that are nearer should be more significant, and the voting right to them should be higher, and the repeated edges means that the two search terms connected by the edge have a high degree of mutual influence and should not be simply ignored. Therefore, determining the out-edge weights between search terms, could more accurately reflect the importance degree between search terms, to increase the accuracy of extracting the headword.

Figure 2:
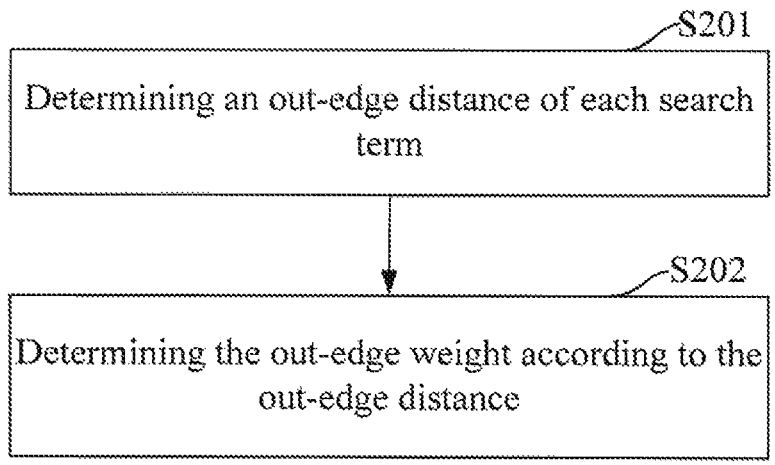
FIG. 2 is another schematic flowchart of a method for extracting a headword according to an embodiment of the present disclosure.

Further, as shown in FIG. 2, step S102 comprises steps S201~S202.

S201, determining an out-edge distance of each search term.

In the embodiment of the present disclosure, the out-edge distance refers to the distance from one search term to another search term, for example, for the search term "Lu'an", "ancient tomb" and "excavation", and taking "ancient tomb" as the focus word, assuming that the size of the input window is 3, then the out-edge distance from the search term "ancient tomb" to the search term "Lu'an" is 1, and the out-edge distance from the search term "ancient tomb" to the search term "excavation" is 1, and the out-edge distance from the search term "Lu'an" to the search term "excavation" is 2; assuming the size of the specified input window is 2, then an edge could be constructed for this input window, ie from "ancient tomb" to "Lu'an" or from "ancient tomb" to "excavation", and the out-edge distance is both 1.

S202, determining the out-edge weight according to the out-edge distance.

In the embodiment of the present disclosure, the out-edge weight is inversely proportional to the out-edge distance, and the shorter the out-edge distance is, the greater the out-edge weight is, and the out-edge weight is proportional to the out-edge frequency and the more the out-edge frequency is, the greater the out-edge weight is, and the calculation method of the out-edge weight may be: firstly, calculating the distance of the edge in different windows, and calculating the weight of the edge in different windows according to the distance of the edge in different windows, and then, summing the weights of the edge in different windows, and taking the sum as the out-edge weight. For example, in the window with a window size of 3, the weight of the edge from "Ancient Tomb" to "Lu'an" is 1.2, and in the window with a window size of 2, the weight of the edge from "Ancient Tomb" to "Lu'an" is 1.8, and normalizing the weight of the edge that starts from the "Ancient Tomb", so the out-edge weight of the edge from "Ancient Tomb" to "Lu'an" is 1.2/(1.2+1.8)=0.4, wherein, the out-edge weight of 0.4 could be expressed that it's a probability of 0.4 to jump to the search term "Lu'an" according to a link; in addition, the calculation method of the out-edge weight could be set by the user, and the specific calculation method will be not limited here.

S103, calculating a linkage-matrix for all the search terms of the text information according to the out-edge weights.

In the embodiment of the present disclosure, the linkage-matrix is for all the search terms of the text information, that is, the out-edge weights of the search terms in different input windows are presented in the form of a matrix; for example, there are m words in the text information, then the dimension of the matrix is m×m, and the j-th column of the i-th row denotes the probability of jumping from the i-th word to the j-th word according to the link.

S104, calculating a priori score of each search term according to a preset document library.

In the embodiment of the present disclosure, the priori score could indicate the importance degree of each search term in the preset document library in the network if no text information input by user is found, wherein, if there are N documents in the preset document library, perform word segmentation to each document in the preset document library, and after removing the pause word, a word segmentation result of all documents could be obtained.

Figure 3:
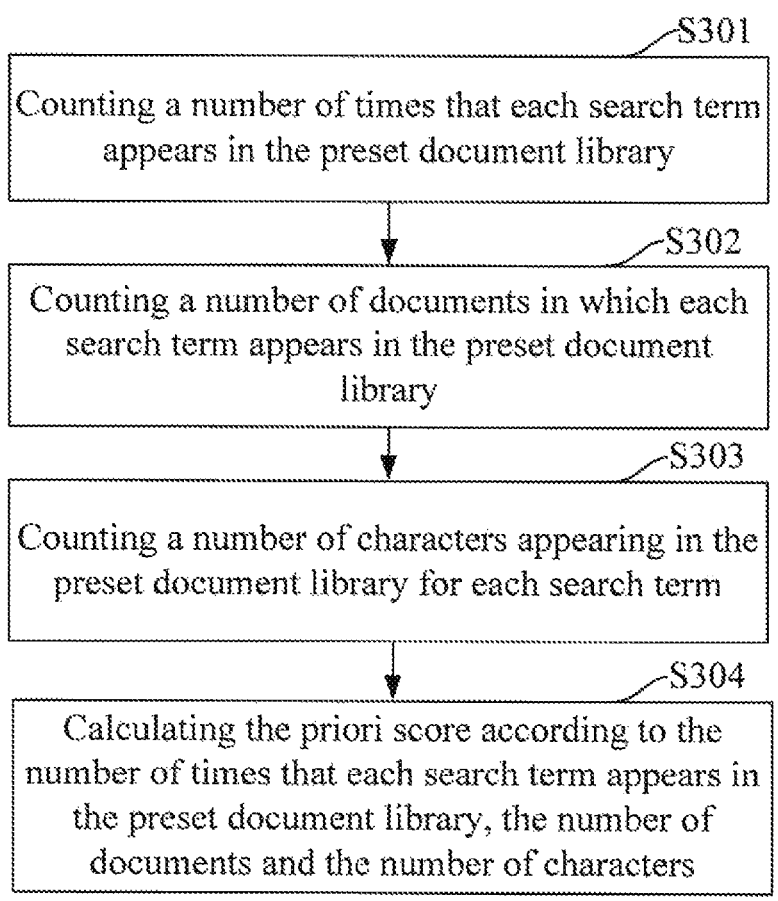
FIG. 3 is another schematic flowchart of a method for extracting a headword according to an embodiment of the present disclosure.

Further, as shown in FIG. 3, step S104 comprises steps S301~S304.

S301, counting a number of times that each search term appears in the preset document library.

In the embodiment of the present disclosure, the number of times that each search term appears in the entire preset document library is counted according to the word segmentation result of the preset document library in the network, and the number of times is recorded as $freq_i$.

S302, counting a number of documents in which each search term appears in the preset document library.

In the embodiment of the present disclosure, the number of documents in which each search term appears in the present document library is counted according to the word segmentation result of the preset document library in the network, and the number of documents is recorded as $docfreq_i$.

S303, counting a number of characters appearing in the preset document library for each search term.

In the embodiment of the present disclosure, the number of characters appearing in the preset document library for each search term is counted according to the word segmentation result of the preset document library in the network, and the number of characters is recorded as $charlen_i$.

S304, calculating the priori score according to the number of times that each search term appears in the preset document library, the number of documents and the number of characters.

In the embodiment of the present disclosure, the priori score is calculated according to the number of times that each search term appears in the preset document library, the number of documents and the number of characters, and could be calculated according to the following formula 3.

The formula 3 is:

$$\text{prior}_i = \log(freq_i) \times \frac{docfreq_i}{N} \times \log(charlen_i + 1)$$

Wherein, prior, denotes the priori score of the search term i; $freq_i$ denotes the number of times that the search term i appears in the entire preset document library; $docfreq_i$ denotes the number of documents in which the search term i appears in the preset document library; $charlen_i$ denotes the number of characters appearing in the preset document library for the search term i; N denotes the total number of documents in the preset document library.

S105, determining a random jumping vector for all the search terms of the text information according to the priori scores.

In the embodiment of the present disclosure, the random jumping vector for all the search terms of the text information is determined according to the priori scores according to the following formula 4, and the formula 4 is: $r_t = \lambda A r_{t-1} + (1-\lambda)g$, wherein, subscript t represents the t-th iteration; $r_t$ is the result of the t-th iteration, and $r_{t-1}$ is the result of the t−1-th iteration (each iteration is calculated based on the result of the previous iteration); A is the linkage-matrix; $\lambda$ is a weighting coefficient, for adjusting the relative weight of "jumping according to the link" and "random jumping"; g is the random jumping vector.

S106, calculating a first preliminary score of each search term according to the linkage-matrix and the random jumping vector.

S107, determining a second preliminary score of each search term according to a preset part-of-speech configuration rule.

In the embodiment of the present disclosure, generally, the search terms could be classified into nouns, verbs, adjectives and other part-of-speech. In practical applications, it's highly likely for the search term with part-of-speech to be a headword; therefore, it is necessary to assign different scores to search terms with different part-of-speech; For example, the search term "ancient tomb" is a noun, the search term "Lu'an" is a noun, and the search term "excavation" is a verb, and a score of a noun could be preset to be 10 and a score of a verb could be preset to be 5, so the corresponding second preliminary score may be determined according to the search terms with different parts-of-speech. Specifically, the scores of the search terms with different part-of-speech may be set by the user, and the specific score assignment method is not limited herein, and the user may configure corresponding scores of part-of-speech according to a specific application scenario.

S108, determining a final degree score of each search term according to the first preliminary score and the second preliminary score.

Figure 4:
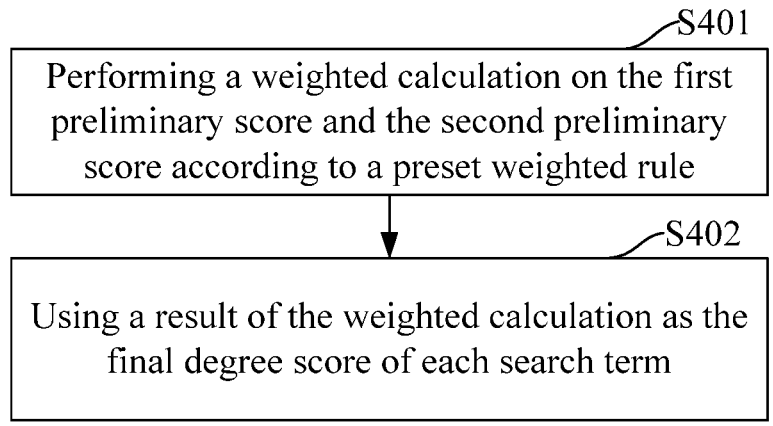
FIG. 4 is another schematic flowchart of a method for extracting a headword according to an embodiment of the present disclosure.

Further, as shown in FIG. 4, step S108 comprises steps S401~S402.

S401, performing a weighted calculation on the first preliminary score and the second preliminary score according to a preset weighted rule.

S402, using a result of the weighted calculation as the final degree score of each search term.

S109, Extracting the headword of the text information according to the final degree scores.

In conclusion, the embodiments of the present disclosure acquire text information input by the user (the text information comprises one or more search terms), and determine an out-edge weight of each search term, and calculate a linkage-matrix for all the search terms of the text information according to the out-edge weights, and calculate a priori score of each search term according to a preset document library, and determine a random jumping vector for all the search terms of the text information according to the priori scores, and calculate a first preliminary score of each search term according to the linkage-matrix and the random jumping vector, and determine a second preliminary score of each search term according to a preset part-of-speech configuration rule, and determine a final degree score of each search term according to the first preliminary score and the second preliminary score, and extract the headword of the text information according to the final degree scores, which could fully utilize the characteristic information of the text itself to extract the headword, and improve the effect of the headword extraction, and also meet the extraction requirements of the headword for the applications.

Person skilled in the art could understand that all or part of the processes in the method of the above embodiments could be implemented by a computer program to instruct related hardware, and the program could be stored in a computer-readable storage medium. When being executed, the program may comprise the flow of the methods of the above embodiments. Wherein, the storage medium may be a magnetic disk, an optical disk, a Read-Only Memory (Read-Only Memory, ROM) and so on.

Figure 5:
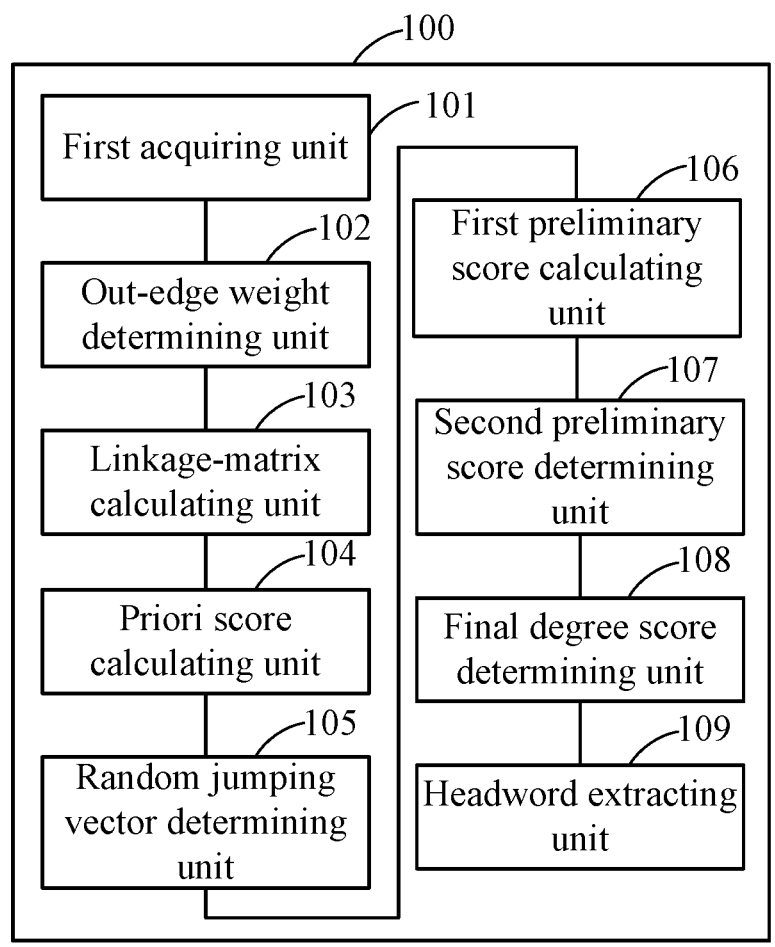
FIG. 5 is a schematic block diagram of a terminal for extracting a headword according to an embodiment of the present disclosure.

Please refer to FIG. 5, corresponding to the above method for extracting a headword, the embodiment of the present disclosure also provides a terminal for extracting a headword, and the terminal 100 comprises: a first acquiring unit 101, an out-edge weight determining unit 102, a linkage-matrix calculating unit 103, a priori score calculating unit 104, a random jumping vector determining unit 105, a first preliminary score calculating unit 106, a second preliminary score determining unit 107, a final degree score determining unit 108, and a headword extracting unit 109.

The first acquiring unit 101 is configured to acquire text information input by a user, and the text information comprises one or more search terms. In the embodiment of the present disclosure, for example, a user inputs text information to be searched into a web browser or a search engine on a terminal, such as "excavation of ancient tomb of Lu'an", and the web browser or the search engine of the terminal acquires the text information input by the user in real time, that's the "excavation of ancient tomb of Lu'an", and the text information comprises a plurality of search terms, which are "Lu'an", "ancient tomb" and "excavation", so that search terms of the text information are determined according to the text information input by the user.

The out-edge weight determining unit 102 is configured to determine the out-edge weight of each search term. In the prior art, for the text information input by the user in a same specified input window, the voting weight of one search term to other search terms is the same, and in different specified input windows, the same edges are not added repeatedly; however, in actual applications, the search term in the same position have different contributions to the search terms of different distances; for a search term, the influence on other search terms that are nearer should be more significant, and the voting right to them should be higher, and the repeated edges means that the two search terms connected by the edge have a high degree of mutual influence and should not be simply ignored. Therefore, determining the out-edge weights between search terms, could more accurately reflect the importance degree between search terms, to increase the accuracy of extracting the headword.

The linkage-matrix calculating unit 103 is configured to calculate a linkage-matrix for all the search terms of the text information according to the out-edge weights. In the embodiment of the present disclosure, the linkage-matrix is for all the search terms of the text information, that is, the out-edge weights of the search terms in different input windows are presented in the form of a matrix; for example, there are m words in the text information, then the dimension of the matrix is m×m, and the j-th column of the i-th row denotes the probability of jumping from the i-th word to the j-th word according to the link.

The priori score calculating unit 104 is configured to calculate a priori score of each search term according to a preset document library. In the embodiment of the present disclosure, the priori score could indicate the importance degree of each search term in the preset document library in the network if no text information input by user is found, wherein, if there are N documents in the preset document library, perform word segmentation to each document in the preset document library, and after removing the pause word, a word segmentation result of all documents could be obtained.

The random jumping vector determining unit 105 is configured to determine a random jumping vector for all the search terms of the text information according to the priori scores. In the embodiment of the present disclosure, the random jumping vector for all the search terms of the text information is determined according to the priori scores according to the following formula 4, and the formula 4 is: $r_t = \lambda A r_{t-1} + (1-\lambda) g$, wherein, subscript t represents the t-th iteration; $r_t$ is the result of the t-th iteration, and $r_{t-1}$ is the result of the t−1-th iteration (each iteration is calculated based on the result of the previous iteration); A is the linkage-matrix; λ is a weighting coefficient, for adjusting the relative weight of "jumping according to the link" and "random jumping"; g is the random jumping vector.

The first preliminary score calculating unit 106 is configured to calculate a first preliminary score of each search term according to the linkage-matrix and the random jumping vector.

The second preliminary score determining unit 107 is configured to determine a second preliminary score of each search term according to a preset part-of-speech configuration rule. In the embodiment of the present disclosure, generally, the search terms could be classified into nouns, verbs, adjectives and other part-of-speech. In practical applications, it's highly likely for the search term with part-of-speech to be a headword; therefore, it is necessary to assign different scores to search terms with different part-of-speech; For example, the search term "ancient tomb" is a noun, the search term "Lu'an" is a noun, and the search term "excavation" is a verb, and a score of a noun could be preset to be 10 and a score of a verb could be preset to be 5, so the corresponding second preliminary score may be determined according to the search terms with different parts-of-speech. Specifically, the scores of the search terms with different part-of-speech may be set by the user, and the specific score assignment method is not limited herein, and the user may configure corresponding scores of part-of-speech according to a specific application scenario.

The final degree score determining unit 108 is configured to determine a final degree score of each search term according to the first preliminary score and the second preliminary score.

The headword extracting unit 109 is configured to extract the headword of the text information according to the final degree scores.

Figure 6:
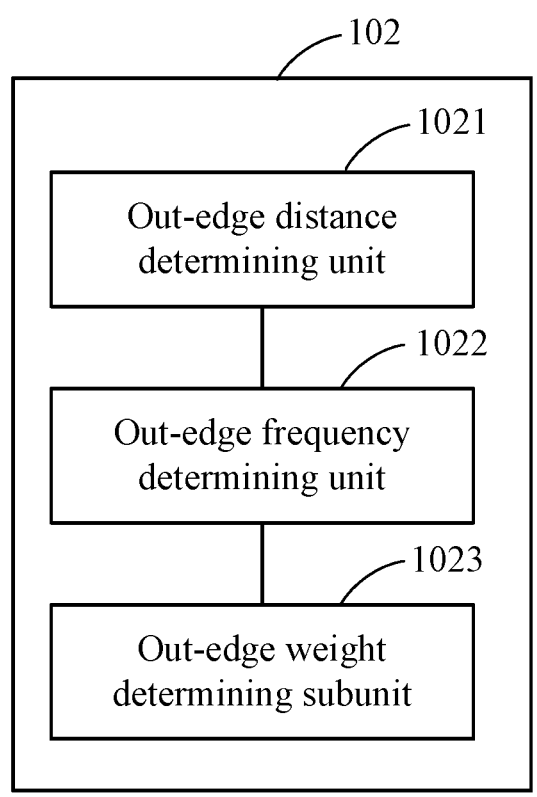
FIG. 6 is another schematic block diagram of a terminal for extracting a headword according to an embodiment of the present disclosure.

As shown in FIG. 6, the out-edge weight determining unit 102 comprises:

An out-edge distance determining unit 1021 is configured to determine an out-edge distance of each search term. In the embodiment of the present disclosure, the out-edge distance refers to the distance from one search term to another search term, for example, for the search term "Lu'an", "ancient tomb" and "excavation", and taking "ancient tomb" as the focus word, assuming that the size of the input window is 3, then the out-edge distance from the search term "ancient tomb" to the search term "Lu'an" is 1, and the out-edge distance from the search term "ancient tomb" to the search term "excavation" is 1, and the out-edge distance from the search term "Lu'an" to the search term "excavation" is 2; assuming the size of the specified input window is 2, then an edge could be constructed for this input window, ie from "ancient tomb" to "Lu'an" or from "ancient tomb" to "excavation", and the out-edge distance is both 1.

An out-edge weight determining subunit 1022 is configured to determine the out-edge weight according to the out-edge distance. In the embodiment of the present disclosure, the out-edge weight is inversely proportional to the out-edge distance, and the shorter the out-edge distance is, the greater the out-edge weight is, and the out-edge weight is proportional to the out-edge frequency and the more the out-edge frequency is, the greater the out-edge weight is, and the calculation method of the out-edge weight may be: firstly, calculating the distance of the edge in different windows, and calculating the weight of the edge in different windows according to the distance of the edge in different windows, and then, summing the weights of the edge in different windows, and taking the sum as the out-edge weight. For example, in the window with a window size of 3, the weight of the edge from "Ancient Tomb" to "Lu'an" is 1.2, and in the window with a window size of 2, the weight of the edge from "Ancient Tomb" to "Lu'an" is 1.8, and normalizing the weight of the edge that starts from the "Ancient Tomb", so the out-edge weight of the edge from "Ancient Tomb" to "Lu'an" is 1.2/(1.2+1.8)=0.4, wherein, the out-edge weight of 0.4 could be expressed that it's a probability of 0.4 to jump to the search term "Lu'an" according to a link; in addition, the calculation method of the out-edge weight could be set by the user, and the specific calculation method will be not limited here.

Figure 7:
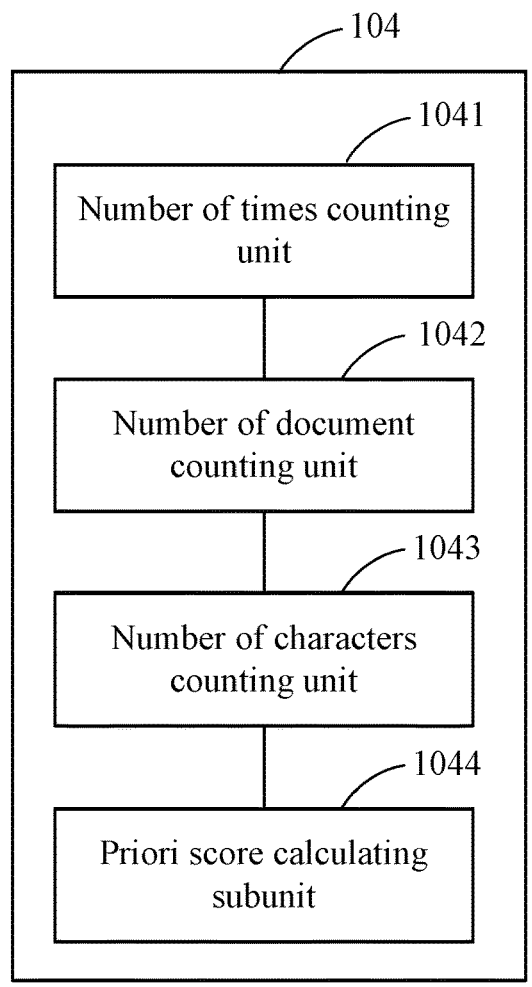
FIG. 7 is another schematic block diagram of a terminal for extracting a headword according to an embodiment of the present disclosure.

As shown in FIG. 7, the priori score calculating unit 104 comprises:

A number of times counting unit 1041 is configured to count the number of times that each search term appears in the preset document library. In the embodiment of the present disclosure, the number of times that each search term appears in the entire preset document library is counted according to the word segmentation result of the preset document library in the network, and the number of times is recorded as $freq_i$.

A number of document counting unit 1042 is configured to count the number of documents in which each search term appears in the preset document library. In the embodiment of the present disclosure, the number of documents in which each search term appears in the present document library is counted according to the word segmentation result of the preset document library in the network, and the number of documents is recorded as $docfreq_i$.

A number of characters counting unit 1043 is configured to count the number of characters appearing in the preset document library for each search term. In the embodiment of the present disclosure, the number of characters appearing in the preset document library for each search term is counted according to the word segmentation result of the preset document library in the network, and the number of characters is recorded as $charlen_i$.

A priori score calculating subunit 1044 is configured to calculate the priori score according to the number of times that each search term appears in the preset document library, the number of documents, and the number of characters. In the embodiment of the present disclosure, the priori score is calculated according to the number of times that each search term appears in the preset document library, the number of documents and the number of characters, and could be calculated according to the following formula 3.

The formula 3 is:

$$prior_i = \log(freq_i) \times \frac{docfreq_i}{N} \times \log(charlen_i + 1)$$

Wherein, $prior_i$ denotes the priori score of the search term i; $freq_i$ denotes the number of times that the search term i appears in the entire preset document library; $docfreq_i$ denotes the number of documents in which the search term i appears in the preset document library; $charlen_i$ denotes the number of characters appearing in the preset document library for the search term i; N denotes the total number of documents in the preset document library.

Figure 8:
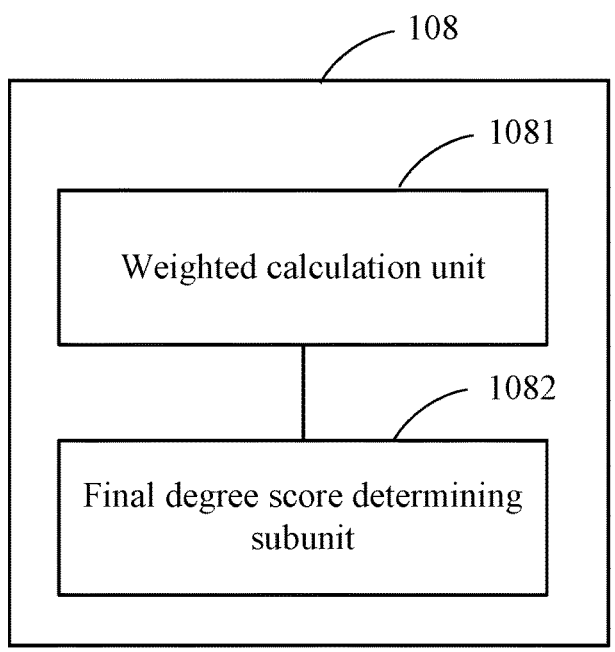
FIG. 8 is another schematic block diagram of a terminal for extracting a headword according to an embodiment of the present disclosure.

As shown in FIG. 8, the final degree score determining unit 108 comprises:

A weighted calculation unit 1081, is configured to perform a weighted calculation on the first preliminary score and the second preliminary score according to a preset weighted rule.

A final degree score determining subunit 1082, is configured to use a result of the weighted calculation as the final degree score of each search term.

About the implementation of hardware, as described above, the first acquiring unit 101, the out-edge weight determining unit 102, the linkage-matrix calculating unit 103, the priori score calculating unit 104, the random jumping vector determining unit 105, the first preliminary score calculating unit 106, the second preliminary score determining unit 107, the final degree score determining unit 108, the headword extracting unit 109 and the like, may be embedded in or independent of a data processing device in the form of hardware, or may be stored in a memory of a data processing device in the form of software so that the processor could call and perform the operations corresponding to the above units. The processor could be a central processing unit (CPU), a microprocessor, a microcontroller, or the like.

Figure 9:
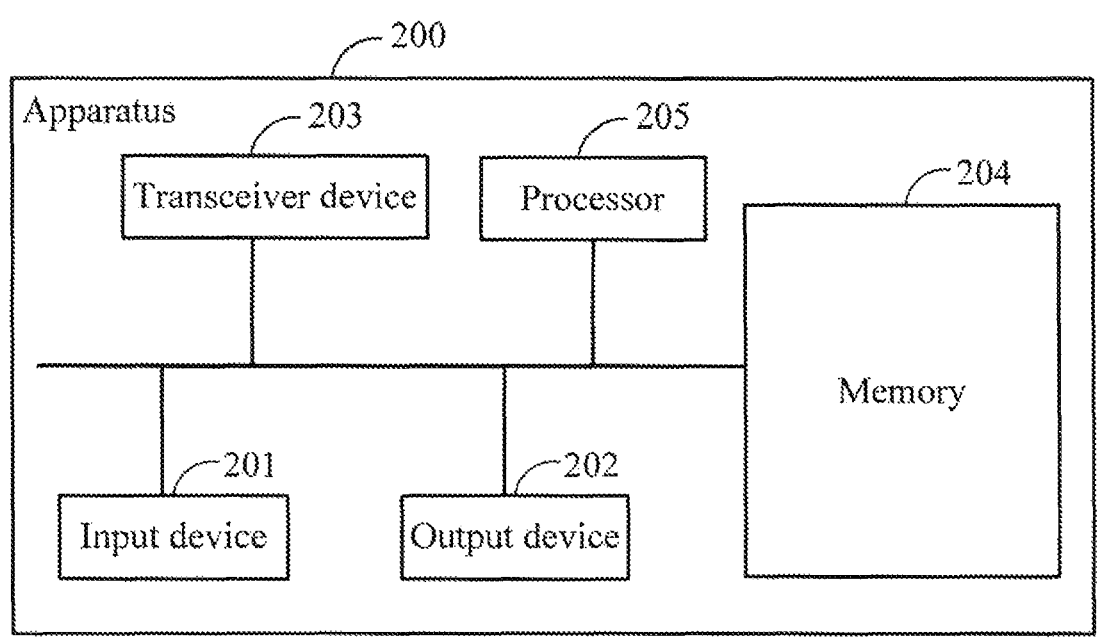
FIG. 9 is a structural schematic diagram of an apparatus for extracting a headword according to an embodiment of the present disclosure.

FIG. 9 is a structural schematic diagram of an apparatus for extracting a headword according to the present disclosure. As shown in FIG. 9, the apparatus 200 may comprise: an input device 201, an output device 202, a transceiver device 203, a memory 204, and a processor 205, wherein:

the input device 201 is configured to receive an input data of an external access control apparatus. In a specific implementation, the input device 201 according to the embodiment of the present disclosure may comprise a keyboard, a mouse, a photoelectric input device, an audio input device, a touching input device, a scanner, and the like.

The output device 202 is configured to output the output data for the access control apparatus. In a specific implementation, the output device 202 according to the embodiment of the present disclosure may comprise a display, a loudspeaker, a printer, and the like.

The transceiver device 203 is configured to send data to other apparatuses or receive data from other apparatuses through communication links. In a specific implementation, the transceiver device 203 according to the embodiment of the present disclosure may comprise a transceiver device such as a radio frequency antenna.

The memory 204 is configured to store a program for implementation. The memory 204 according to the embodiment of the present disclosure may be a memory of system, such as non-volatile memory (such as ROM, flash memory, etc.). In a specific implementation, the memory 204 of the embodiment of the present disclosure may also be an external memory outside of the system, such as a magnetic disk, an optical disk, a magnetic tape, and the like.

The processor 205 is configured to run the program stored in the memory 204 and perform the following operations: acquiring text information input by a user, and the text information comprises one or more search terms; determining an out-edge weight of each search term; calculating a linkage-matrix for all the search terms of the text information according to the out-edge weights; calculating a priori score of each search term according to a preset document library; determining a random jumping vector for all the search terms of the text information according to the priori scores; calculating a first preliminary score of each search term according to the linkage-matrix and the random jumping vector; determining a second preliminary score of each search term according to a preset part-of-speech configuration rule; determining a final degree score of each search term according to the first preliminary score and the second preliminary score; and extracting the headword of the text information according to the final degree scores.

Further, the operation of determining an out-edge weight of each search term comprises: determining an out-edge distance of each search term; and determining the out-edge weight according to the out-edge distance.

Further, the operation of calculating a priori score of each search term according to a preset document library comprises: counting a number of times that each search term appears in the preset document library; counting a number of documents in which each search term appears in the preset document library; counting a number of characters appearing in the preset document library for each search term; and calculating the priori score according to the number of times that each search term appears in the preset document library, the number of documents and the number of characters.

Further, the random jumping vector for all the search terms of the text information is calculated according to the following formula: $r_t = \lambda A r_{t-1} + (1-\lambda)g$, wherein, subscript t represents the t-th iteration; $r_t$ is the result of the t-th iteration, and $r_{t-1}$ is the result of the t−1-th iteration (each iteration is calculated based on the result of the previous iteration); A is the linkage-matrix; $\lambda$ is a weighting coefficient, for adjusting the relative weight of "jumping according to the link" and "random jumping"; g is the random jumping vector.

Further, the operation of determining a final degree score of each search term according to the first preliminary score and the second preliminary score comprises: performing a weighted calculation on the first preliminary score and the second preliminary score according to a preset weighted rule; and using a result of the weighted calculation as the final degree score of each search term.

Person skilled in the art could understand that the embodiment of the apparatus for extracting the headword shown in FIG. 9 does not constitute a limitation to the specific configuration of the apparatus for extracting the headword. In other embodiments, the apparatus for extracting the headword may comprise more or less components than that shown in FIG, or combine some components, or different arrangement of components. For example, in some embodiments, the apparatus for extracting the headword may only comprise a memory and a processor. In such an embodiment, the structures and functions of the memory and the processor are the same as those in the embodiment shown in FIG. 9, and details are not described herein again.

The present disclosure provides a computer-readable storage medium. The computer-readable storage medium stores one or more programs, and the one or more programs may be run by one or more processors to implement the following steps: acquiring text information input by a user, and the text information comprises one or more search terms; determining an out-edge weight of each search term; calculating a linkage-matrix for all the search terms of the text information according to the out-edge weights; calculating a priori score of each search term according to a preset document library; determining a random jumping vector for all the search terms of the text information according to the priori scores; calculating a first preliminary score of each search term according to the linkage-matrix and the random jumping vector; determining a second preliminary score of each search term according to a preset part-of-speech configuration rule; determining a final degree score of each search term according to the first preliminary score and the second preliminary score; and extracting the headword of the text information according to the final degree scores.

The computer-readable storage medium is run by the processor, so that the one or more processors further perform the following steps: the step of determining an out-edge weight of each search term comprises: determining an out-edge distance of each search term; and determining the out-edge weight according to the out-edge distance.

The computer-readable storage medium is run by the processor, so that the one or more processors further perform the following steps: the step of calculating a priori score of each search term according to a preset document library comprises: counting a number of times that each search term appears in the preset document library; counting a number of documents in which each search term appears in the preset document library; counting a number of characters appearing in the preset document library for each search term; and calculating the priori score according to the number of times that each search term appears in the preset document library, the number of documents and the number of characters.

The computer-readable storage medium is run by the processor, so that the one or more processors further perform the following steps: the random jumping vector for all the search terms of the text information is calculated according to the following formula: $r_t = \lambda A r_{t-1} + (1-\lambda)g$, wherein, subscript t represents the t-th iteration; $r_t$ is the result of the t-th iteration, and $r_{t-1}$ is the result of the t−1-th iteration (each iteration is calculated based on the result of the previous iteration); A is the linkage-matrix; λ is a weighting coefficient, for adjusting the relative weight of "jumping according to the link" and "random jumping"; g is the random jumping vector.

The computer-readable storage medium is run by the processor, so that the one or more processors further perform the following steps: the step of determining a final degree score of each search term according to the first preliminary score and the second preliminary score comprises: performing a weighted calculation on the first preliminary score and the second preliminary score according to a preset weighted rule; and using a result of the weighted calculation as the final degree score of each search term.

The foregoing storage medium of the present disclosure may be non-volatile storage medium, such as various mediums that could store program codes, such as a magnetic disk, an optical disk, a Read-Only Memory (Read-Only Memory, ROM).

The units of all embodiments of the present disclosure may be implemented by a general integrated circuit such as a CPU (Central Processing Unit, CPU) or an ASIC (Application Specific Integrated Circuit, ASIC).

The steps of the embodiments of the present disclosure may be adjusted in sequence, combined, and deleted according to actual needs.

The units of the embodiments of the present disclosure could be combined, divided, and deleted according to actual needs.

The foregoing descriptions are merely embodiments of the present disclosure, but the protection scope of the present disclosure is not limited thereto. Any person skilled in the art could easily conceive various equivalent modifications or substitutions within the technical scope disclosed by the present disclosure, and these modifications or substitutions should be comprised in the protection scope of the present disclosure. Therefore, the protection scope of the present disclosure shall be subject to the protection scope of the claims.

What is claimed is:

1. A method for extracting a headword, comprising:
   acquiring a text information input by a user, and the text information comprises one or more search terms;
   determining an out-edge weight of each search term;
   calculating a linkage-matrix for the each search term of the text information according to the out-edge weight;
   calculating a priori score of the each search term according to a preset document library;
   determining a random jumping vector for the each search term of the text information according to the priori score;
   calculating a first preliminary score of the each search term according to the linkage-matrix and the random jumping vector;
   determining a second preliminary score of the each search term according to a preset part-of-speech configuration rule;
   determining a final degree score of the each search term according to the first preliminary score and the second preliminary score;
   extracting the headword of the text information according to the final degree score.

2. The method according to claim 1, wherein the step of determining an out-edge weight of each search term comprises:
   determining an out-edge distance of the each search term;
   determining the out-edge weight according to the out-edge distance.

3. The method according to claim 1, wherein the step of calculating a priori score of the each search term according to a preset document library comprises:
   counting a number of times that the each search term appears in the preset document library;
   counting a number of documents in which the each search term appears in the preset document library;
   counting a number of characters appearing in the preset document library for the each search term;
   calculating the priori score according to the number of times, the number of documents and the number of characters that the each search term appears in the preset document library.

4. The method according to claim 1, wherein the random jumping vector for the each search term of the text information is calculated according to the following formula:

$$r_t = \lambda A r_{t-1} + (1-\lambda)g;$$

wherein, subscript t represents the t-th iteration; $r_t$ is the result of the t-th iteration, and $r_{t-1}$ is the result of the t−1-th iteration; A is the linkage-matrix; λ is a weighting coefficient, for adjusting the relative weight of "jumping according to the link" and "random jumping"; g is the random jumping vector.

5. The method according to claim 1, wherein the step of determining a final degree score of the each search term according to the first preliminary score and the second preliminary score comprises:
   performing a weighted calculation on the first preliminary score and the second preliminary score according to a preset weighted rule;
   using a result of the weighted calculation as the final degree score of each search term.

6. An apparatus for extracting a headword, comprising: a memory and a processor;
   the memory, for storing a program for implementation;
   the processor, for running the program stored in the memory to perform the following operations:
   acquiring a text information input by a user, and the text information comprises one or more search terms;
   determining an out-edge weight of each search term;
   calculating a linkage-matrix for the each search term of the text information according to the out-edge weight;
   calculating a priori score of the each search term according to a preset document library;
   determining a random jumping vector for the each search term of the text information according to the priori score;
   calculating a first preliminary score of the each search term according to the linkage-matrix and the random jumping vector;
   determining a second preliminary score of the each search term according to a preset part-of-speech configuration rule;
   determining a final degree score of the each search term according to the first preliminary score and the second preliminary score;
   extracting the headword of the text information according to the final degree score.

7. The apparatus according to claim 6, wherein the operation of determining an out-edge weight of each search term comprises:
- determining an out-edge distance of the each search term;
- determining the out-edge weight according to the out-edge distance.

8. The apparatus according to claim 6, wherein the operation of calculating a priori score of the each search term according to a preset document library comprises:
- counting a number of times that the each search term appears in the preset document library;
- counting a number of documents in which the each search term appears in the preset document library;
- counting a number of characters appearing in the preset document library for the each search term;
- calculating the priori score according to the number of times, the number of documents and the number of characters that the each search term appears in the preset document library.

9. The apparatus according to claim 6, wherein the random jumping vector for the each search term of the text information is calculated according to the following formula:

$$r_t = \lambda A r_{t-1} + (1-\lambda)g;$$

wherein, subscript t represents the t-th iteration; $r_t$ is the result of the t-th iteration, and $r_{t-1}$ is the result of the t−1-th iteration; A is the linkage-matrix; λ is a weighting coefficient, for adjusting the relative weight of "jumping according to the link" and "random jumping"; g is the random jumping vector.

10. The apparatus according to claim 6, wherein the operation of determining a final degree score of the each search term according to the first preliminary score and the second preliminary score comprises:
- performing a weighted calculation on the first preliminary score and the second preliminary score according to a preset weighted rule;
- using a result of the weighted calculation as the final degree score of each search term.

11. A non-transitory computer-readable storage medium, wherein the computer-readable storage medium stores one or more programs, and the one or more programs could be run by one or more processors to implement the following steps:
- acquiring a text information input by a user, and the text information comprises one or more search terms;
- determining an out-edge weight of each search term;
- calculating a linkage-matrix for the each search term of the text information according to the out-edge weight;
- calculating a priori score of the each search term according to a preset document library;
- determining a random jumping vector for the each search terms of the text information according to the priori scores;
- calculating a first preliminary score of the each search term according to the linkage-matrix and the random jumping vector;
- determining a second preliminary score of the each search term according to a preset part-of-speech configuration rule;
- determining a final degree score of the each search term according to the first preliminary score and the second preliminary score;
- extracting the headword of the text information according to the final degree score.

12. The non-transitory computer-readable storage medium according to claim 11, wherein the step of determining an out-edge weight of each search term comprises:
- determining an out-edge distance of the each search term;
- determining the out-edge weight according to the out-edge distance.

13. The non-transitory computer-readable storage medium according to claim 11, wherein the step of calculating a priori score of the each search term according to a preset document library comprises:
- counting a number of times that the each search term appears in the preset document library;
- counting a number of documents in which the each search term appears in the preset document library;
- counting a number of characters appearing in the preset document library for the each search term;
- calculating the priori score according to the number of times, the number of documents and the number of characters that each search term appears in the preset document library.

14. The non-transitory computer-readable storage medium according to claim 11, wherein the random jumping vector for the each search term of the text information is calculated according to the following formula:

$$r_t = \lambda A r_{t-1} + (1-\lambda)g,$$

wherein, subscript t represents the t-th iteration; $r_t$ is the result of the t-th iteration, and $r_{t-1}$ is the result of the t−1-th iteration (each iteration is calculated based on the result of the previous iteration); A is the linkage-matrix; λ is a weighting coefficient, for adjusting the relative weight of "jumping according to the link" and "random jumping"; g is the random jumping vector.

15. The non-transitory computer-readable storage medium according to claim 11, wherein the step of determining a final degree score of the each search term according to the first preliminary score and the second preliminary score comprises:
- performing a weighted calculation on the first preliminary score and the second preliminary score according to a preset weighted rule;
- using a result of the weighted calculation as the final degree score of the each search term.

* * * * *